(12) United States Patent
Yamashita et al.

(10) Patent No.: US 6,174,965 B1
(45) Date of Patent: Jan. 16, 2001

(54) POLYESTER RESIN, PROCESS FOR ITS PRODUCTION AND ITS USE

(75) Inventors: Fumio Yamashita, Yokohama; Yoshiyuki Yukawa; Haruhiko Aida, both of Hiratsuka, all of (JP)

(73) Assignee: Kansai Paint Company, Limited, Amagasaki (JP)

( * ) Notice: Under 35 U.S.C. 154(b), the term of this patent shall be extended for 0 days.

(21) Appl. No.: 09/255,336

(22) Filed: Feb. 23, 1999

(30) Foreign Application Priority Data

Feb. 25, 1998 (JP) ................................................ 10-043373

(51) Int. Cl.⁷ ..................................................... C08F 20/00
(52) U.S. Cl. .......................... 525/437; 528/288; 528/290; 528/291; 524/602
(58) Field of Search ............................ 525/437; 528/288, 528/290, 291

(56) References Cited

U.S. PATENT DOCUMENTS 3,816,378 * 6/1974 Schmadel .............................. 528/290
3,873,603 * 3/1975 Schmadel .............................. 560/151
4,035,275 * 7/1977 Sturni .................................... 204/503

* cited by examiner

*Primary Examiner*—Patricia A. Short
(74) *Attorney, Agent, or Firm*—Armstrong, Westerman, Hattori, McLeland, & Naughton

(57) ABSTRACT

The present invention provides a polyester resin having in the molecule at least one quaternary ammonium base represented by the formula

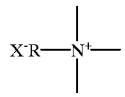

(I)

(wherein X is halogen and R is alkyl), and a process for its production. The present invention further provides a pigment dispersion containing a pigment and the above polyester resin as resin for dispersion of the pigment, and also provides a coating composition containing the above pigment dispersion.

14 Claims, No Drawings

POLYESTER RESIN, PROCESS FOR ITS PRODUCTION AND ITS USE

The present invention relates to a novel polyester resin which is excellent in dispersion stability of pigments and inorganic powders, and to a process for its production and its use.

Polyester resins have been used in a wide variety of technical fields, for examples, coating materials, inks, adhesives and the like. In such use, polyester resins are often used as resin for dispersion of pigments or inorganic powders. However, when conventional polyester resins are mixed with certain kinds of pigments or inorganic powders to form dispersions, there arise the problems of coagulation of pigment and increased viscosity during production or storage. Such a dispersion, if incorporated into a coating or ink composition, not only adversely affects storage properties, coloring property and workability of the composition but also forms coating film with unsatisfactory properties in weather resistance, chemical resistance and the like.

In view of the above problems, there have been proposed a coating composition and an ink composition, each prepared with the use of a sulfonic acid metal base-containing polyester resin having excellent pigment dispersibility (Japanese Unexamined Patent Publications Nos. 210960/1983 and 26070/1985). According to these compositions, a polar group introduced to polyester resin, namely, sulfonic acid metal base inhibits pigment particles from coagulation in the composition, thus giving high storage stability and forming coating film with excellent characteristics in gloss, weather resistance, water resistance, chemical resistance, etc. However, when sulfonic acid metal base-containing polyester resin is used with some kinds of pigments and basal resins for coating compositions, inferior coloring property may result.

Under the circumstances, there has been awaited the development of a polyester resin which is capable of fully dispersing a wide variety of pigments and inorganic powders to form stable dispersions.

An object of the present invention is to provide a novel polyester resin which is capable of fully dispersing a wide variety of pigments and inorganic powders to form stable dispersions, and to provide a process for its production.

Another object of the present invention is to provide a pigment dispersion and a coating composition, each containing the above polyester resin as resin for pigment dispersion.

Other objects and features of the present invention will become apparent from the following description.

The present invention provides a polyester resin having in the molecule at least one quaternary ammonium base represented by the formula

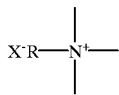
(I)

(wherein X is halogen and R is alkyl), and a process for its production.

The present invention further provides a pigment dispersion containing a pigment and the above polyester resin as resin for pigment dispersion.

The present invention also provides a coating composition containing the above pigment dispersion.

To develop the above requested polyester resin, the present inventors carried out intensive research and found that when quaternary ammonium base of formula (I) is introduced as a polar group, polyester resin is capable of dispersing a wide variety of pigments and inorganic powders better than, or as well as, sulfonic acid metal base-containing polyester resin, and that a pigment dispersion and a coating composition, each prepared using the above polyester resin are excellent in storage stability, coating workability and coloring property. The present invention has been accomplished based on these findings.

The polyester resin of the invention is prepared with the use of a polybasic acid and a polyhydric alcohol as principal starting ingredients, the polyester resin having quaternary ammonium base of formula (I) in the molecule.

In formula (I), X represents fluorine, chlorine, bromine or iodine. R represents, for example, a $C_{1-22}$ alkyl group such as methyl, ethyl, propyl, butyl, pentyl, hexyl, octyl, dodecyl or the like, among which $C_{1-4}$ lower alkyl groups such as methyl, ethyl, propyl and butyl are preferred.

The polyester resin of the invention usually contains quaternary ammonium base in an amount of 0.01 to 1 mole, preferably 0.02 to 0.8 mole, per kg of the resin solids. The above molar amount of the quaternary ammonium base was determined according to the organic sulfuric acid salt method (J. Am., Pharm. Assoc., 43, 240, 1954), which comprises adding sodium lauryl sulfate solution dropwise to chloroform solution of the test resin in the presence of Methyl Yellow as an indicator in an acidic atmosphere and calculating the amount of quaternary ammonium base from the titre.

When the quaternary ammonium base content of the resin is less than 0.01 mole, dispersion stabilizing effects on pigments tend to be low. On the other hand, more than 1 mole is likely to impair water resistance of coating film. Thus any amount outside the above range is undesirable.

The polyester resin of the invention has quaternary ammonium base of formula (I) in the molecule, more specifically, in the molecular skeleton, molecular terminal or both. Among them, it is preferable for the resin to have quaternary ammonium base in the molecular terminal.

The polyester resin of the invention usually has a number average molecular weight of 500 to 50,000, preferably 1,000 to 20,000. When the number average molecular weight is less than 500, dispersion stabilizing effects on pigments tend to be low. With a number average molecular weight over 50,000, the resin tends to have too high viscosity and is difficult to handle, hence undesirable. The resin of the invention preferably has an acid value of less than about 20 mgKOH/g.

The polyester resin of the invention has quaternary ammonium base as introduced thereto and there is no limitation on the method for its introduction.

The polyester resin of the invention may be produced by various processes. For example, the following processes (1), (2) and (3) may be preferably used for its production.

(1) A process for producing a polyester resin with the use of at least one polybasic acid and at least one polyhydric alcohol as starting ingredients, the process comprising the steps of polycondensating, together with the polybasic acid and the polyhydric alcohol, a nitrogen-containing compound represented by the formula

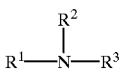
(II)

(wherein $R^1$, $R^2$ and $R^3$ are the same or different and independently represent hydroxyalkyl, carboxyaryl, carboxyalkyl, carboxycycloalkyl, hydrogen, alkyl, cycloalkyl or aryl, provided, however, that at least one of $R^1$, $R^2$ and $R^3$ represents hydroxyalkyl, carboxyaryl, carboxyalkyl or carboxycycloalkyl) to introduce amino groups to the resin, and reacting the amino groups with alkyl halide to convert some or all of the amino groups to quaternary ammonium base represented by the formula

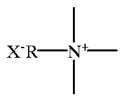

(I)

(wherein X is halogen and R is alkyl).

Examples of alkyl groups represented by $R^1$, $R^2$ and $R^3$ in formula (II) are $C_{1-22}$ alkyl groups such as methyl, ethyl, propyl, butyl, pentyl, hexyl, octyl and dodecyl, among which $C_{1-4}$ lower alkyl groups such as methyl, ethyl, propyl and butyl are preferred. Examples of cycloalkyl groups include cyclopentyl and cyclohexyl. Suitable hydroxyalkyl groups are $C_{1-4}$ hydroxyalkyl groups such as methylol, hydroxyethyl and hydroxypropyl. Suitable carboxyaryl groups are those formed by introducing a carboxyl group to a $C_{6-8}$ aryl group and include, for example, carboxyphenyl. Suitable carboxyalkyl groups are those formed by introducing a carboxyl group to a $C_{1-4}$ alkyl group and include, for example, carboxyethyl. Suitable carboxycycloalkyl groups are those formed by introducing a carboxyl group to a $C_{5-6}$ cycloalkyl group and include, for example, carboxycyclohexyl.

Examples of nitrogen-containing compounds represented by formula (II) are alkanolamines such as aminopropanol, diemthylaminomethanol, dimethylaminoethanol, dimethylaminopropanol, N-dodecylaminoethanol, N-methyldiethanolamine, 2-(N-hydroxymethylamino) ethanol, N-isobutyldiethanolamine, N-methyldibutanolamine, triethanolamine and tributanolamine; aromatic aminocarboxylic acids such as 3-aminophthalic acid, 3-dimethyl aminobenzoic acid, 4-methyl aminobenzoic acid and 4-aminobenzoic acid; and amino acids such as glycine and alanine. These nitrogen-containing compounds may be used singly or as a mixture of two or more.

Suitable polybasic acids for use as a principal starting ingredient of the polyester resin are, for example, aromatic dicarboxylic acids such as terephthalic acid, isophthalic acid, phthalic anhydride, 1,4-naphthoic acid, diphenic acid, 4,4'-oxybenzoic acid, diglycollic acid and 2,5-naphthalenedicarboxylic acid; aliphatic or alicyclic dicarboxylic acids such as tetrahydrophthalic anhydride, 2,5-norbornenedicarboxylic acid, oxalic acid, malonic acid, dimethylmalonic acid, succinic acid, glutaric acid, 2,2-dimethylglutaric acid, adipic acid, dodecanedicarboxylic acid, azelaic acid, sebacic acid and 1,3-cyclohexanedicarboxylic acid, and acid anhydrides thereof; and $C_{1-4}$ alkyl esters of these dicarboxylic acids. These dicarboxylic acids, their acid anhydrides and their esters may be used singly or as a mixture of two or more.

In addition to these dicarboxylic acids, a trivalent or higher polycarboxylic acid (e.g., trimellitic acid, pyromellitic acid, butanetetracarboxylic acid or the like) may be used together. Further, a small amount of unsaturated dicarboxylic acid (e.g., maleic anhydride, maleic acid, itaconic anhydride, fumaric acid or the like) or its ester may be used together.

Suitable polyhydric alcohols for use as a principal starting ingredient of the polyester resin are, for example, dihydric alcohols such as ethylene glycol, diethylene glycol, triethylene glycol, polyethylene glycol, 1,2- or 1,3-propylene glycol, dipropylene glycol, polypropylene glycol, neopentyl glycol, 1,5-pentanediol, 1,6-hexanediol, 2-ethyl-1,3-hexanediol, 2,2,4-trimethyl-1,3-pentanediol, 1,4-cyclohexanedimethanol, polytetramethylene glycol, bisphenol A, hydrogenated bisphenol A and the like. These dihydric alcohols may be used singly or as a mixture of two or more. In addition to these dihydric alcohols, a trivalent or higher alcohol (e.g., trimethylol propane, glycerine, pentaerythritol, etc.) may be used together.

According to the above process (1), a polybasic acid, a polyhydric alcohol and a nitrogen-containing compound, optionally with a catalyst, are placed, all at once or in any order, into a reactor equipped with a stirrer, total condenser, partial condenser and torque meter. The mixture is heated to 150 to 250° C. for polycondensation reaction, thus giving an amino-containing polyester resin.

When the nitrogen-containing compound is alkanolamine, it is added in an amount of 0.3 mole% or more, preferably 0.5 to 50 mole%, based on the total molar amount of the polyvalent alcohol component. When the nitrogen-containing compound is aromatic aminocarboxylic acid, it is added in an amount of 0.3 mole% or more, preferably 0.5 to 50 mole%, based on the total molar amount of the polybasic acid component. In these cases, less than 0.3% mole of the nitrogen-containing compound is undesirable because it is insufficient in the amount of amino groups to be converted to quaternary ammonium base, thus producing unsatisfactory dispersion stabilizing effects on pigments.

When the nitrogen-containing compound contains one hydroxyl group or one carboxyl group in the molecule, the polyester resin formed has an amino group in the molecular terminal and thus can form a polyester resin having quaternary ammonium base in the molecular terminal.

When the nitrogen-containing compound contains two or three hydroxyl or carboxyl groups in the molecule, the polyester resin formed has amino groups in the molecular skeleton and thus can form a polyester resin having quaternary ammonium bases in the molecular skeleton.

Subsequently, the amino-containing polyester resin is reacted with alkyl halide at 40 to 100° C. to convert part or all of the amino groups to quaternary ammonium base, thus giving the desired polyester resin.

Suitable alkyl halide for use may be represented by the formula RX (wherein X and R are as defined above) and includes, for example, methyl iodide, ethyl iodide, propyl bromide and butyl bromide. Alkyl halide is used in an amount required to convent amino groups in the polyester resin to quaternary ammonium base of formula (I). Usually, this amount is suitably selected from such a range that the resulting polyester resin will contain 0.01–1 mole of quaternary ammonium base per kg of the resin solids.

(2) A process for producing a polyester resin, which comprises the steps of preparing a polyester resin with the use of at least one polybasic acid and at least one polyhydric alcohol as starting ingredients and subjecting the remaining carboxyl groups in the polyester resin to addition reaction with a quaternary ammonium base-containing epoxy compound represented by the formula

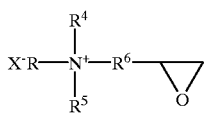

(wherein X and R are as shown above, $R^4$ and $R^5$ are the same or different and independently represent alkyl, cycloalkyl or aryl and $R^6$ represents alkylene) to introduce quaternary ammonium base to the resin.

The polybasic acid and polyhydric alcohol for use as principal starting ingredients may be selected from those mentioned in the above process (1). In addition to these principal ingredients, a nitrogen-containing compound as mentioned in the above process (1) may also be used as a starting ingredient.

Examples of alkyl groups represented by $R^4$ and $R^5$ in formula (III) are $C_{1-22}$ alkyl groups such as methyl, ethyl, propyl, butyl, pentyl, hexyl, octyl and dodecyl, among which $C_{1-4}$ lower alkyl groups such as methyl, ethyl, propyl and butyl are preferred. Examples of cycloalkyl groups include cyclopentyl and cyclohexyl. Examples of aryl groups include phenyl and tolyl. Examples of alkylene groups represented by $R^6$ are $C_{1-22}$ alkylene groups such as methylene, ethylene, propylene and butylene, among which $C_{1-4}$ alkylene groups such as methylene and ethylene are preferred.

Examples of quaternary ammonium base-containing epoxy compounds represented by formula (III) include glycidyltrimethylammoniumchloride and the like.

According to the above process (2), a polybasic acid and a polyhydric alcohol, optionally with a nitrogen-containing compound and a catalyst, are placed, all at once or in any order, into a reactor equipped with a stirrer, total condenser, partial condenser and torque meter. The mixture is heated to 150 to 250° C. for polycondensation reaction and the reaction is terminated at the point when the desired amount of carboxyl groups remain in the polyester resin. Subsequently at 50 to 150° C., esterification reaction is allowed to proceed between the remaining carboxyl groups in the polyester resin and epoxy groups in the quaternary ammonium base-containing epoxy compound for addition of the compound to the resin, thus giving the desired polyester resin. In the above addition reaction, temperatures higher than 150° C. are undesirable because the quaternary ammonium base decomposes at such temperatures.

(3) A process for producing a polyester resin, which comprises the steps of preparing a polyester resin with the use of at least one polybasic acid and at least one polyhydric alcohol as starting ingredients, subjecting the remaining hydroxyl groups in the polyester resin to addition reaction with acid anhydride to introduce carboxyl groups to the resin, and subjecting the carboxyl groups to addition reaction with a quaternary ammonium base-containing epoxy compound represented by the formula

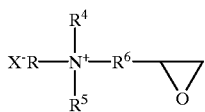

(wherein X, R, $R^4$, $R^5$ and $R^6$ are as defined above) to introduce quaternary ammonium base to the resin.

The polybasic acid and polyhydric alcohol for use as principal starting ingredients may be selected from those mentioned in the above process (1). In addition to these principal ingredients, a nitrogen-containing compound as mentioned in the above process (1) may also be used as a starting ingredient.

Acid anhydride for use in addition reaction may be selected from those already mentioned as examples of polybasic acids in the above process (1).

According to the above process (3), a polybasic acid and a polyhydric alcohol, optionally with a nitrogen-containing compound and a catalyst, are placed, all at once or in any order, into a reactor equipped with a stirrer, total condenser, partial condenser and torque meter. The mixture is heated to 150 to 250° C. for polycondensation reaction, thus giving a polyester resin. Subsequently the remaining hydroxyl groups in the polyester resin are subjected to addition reaction with acid anhydride at 80 to 170° C. to introduce carboxyl groups as half ester groups. During the addition reaction, care should be taken to prevent ester interchange reaction. Subsequently, as in the above process (2), esterification reaction is allowed to proceed at 50 to 150° C. between the introduced carboxyl groups in the polyester resin and epoxy groups in the quaternary ammonium base-containing epoxy compound for addition of the compound to the resin, thus giving the desired polyester resin.

According to the above method (2) or (3), polyester resin having quaternary ammonium base in the molecular terminal can be obtained.

The polyester resin of the invention thus obtained has excellent pigment dispersibility and is suitable for use in forming pigment dispersion. A highly stable pigment dispersion is obtained by simply dispersing a pigment together with this polyester resin and an organic solvent using a conventional dispersing device.

Thus the present invention provides a pigment dispersion containing a pigment and, as resin for dispersion of the pigment, a polyester resin having in the molecule a quaternary ammonium base represented by formula (I).

Examples of pigments are color pigments such as titanium oxide, red iron oxide, chrome yellow, carbon black, phthalocyanine pigment, quinacridone pigment, perylene pigment, azo pigment, dioxane pigment, thioindigo pigment and isoindoline pigment; and extenders such as calcium carbonate, kaolin, clay, alumina, talc and mica.

The polyester resin of the invention is capable of fully dispersing a wide variety of pigments and inorganic powders, and is particularly excellent in dispersion of phthalocyanine pigments.

Suitable organic solvents for use include but are not limited to conventional solvents such as hydrocarbons, alcohols, esters and ketones.

Known pigment dispersants may also be added for dispersion.

The pigment dispersion of the invention generally contains about 5 to 2,000 parts by weight of a pigment per 100 parts by weight of polyester resin on a solids basis.

The above pigment dispersion can be used as it is or together with other basal resin and a crosslinking agent, in the form of a coating composition or an ink composition.

The polyester resin of the invention functions not only as resin for pigment dispersion but also as basal resin for coating compositions. Thus the above pigment dispersion, optionally as mixed with other basal resin and a crosslinking agent, is suitable for use as a coating composition. In this case, with the use of a crosslinking agent, a thermosetting coating composition can be formed and without using any crosslinking agents, a lacquer coating composition can be formed.

Thus the present invention provides a coating composition containing the above pigment dispersion.

The basal resin and crosslinking agent for use in combination with the pigment dispersion can be selected from a wide variety of conventional ones insofar as they are compatible with the polyester resin. Examples of useful basal resins are polyester or acrylic resins having hydroxyl, carboxyl or epoxy groups as crosslinking groups. Examples of useful crosslinking agents are melamine resin, polyisocyanate compounds, polyepoxy compounds, polycarboxylic acid and the like.

The coating composition of the invention is preferably liquid one having a solids concentration of about 30 to 70 wt. %. Suitable media are organic solvents such as hydrocarbons, alcohols, esters and ketones.

The coating composition of the invention may contain various kinds of additives. Examples of additives include those customary for the preparation of coating compositions, such as curing catalysts, lubricants, leveling agents and the like which are selected based on the desired property.

Examples and Comparative Examples are given below to illustrate the present invention.

EXAMPLE 1
Production of Polyester Resin Solution

A 5-liter 4-necked flask equipped with a stirrer, partial condenser, total condenser and torque meter was charged with 266 g (0.18 mole) of phthalic anhydride, 708 g (0.46 mole) of hexahydrophthalic anhydride, 438 g (0.3 mole) of adipic acid, 389 g (0.29 mole) of trimethylolpropane, 634 g (0.61 mole) of neopentyl glycol and 119 g (0.1 mole) of methyl diethanolamine. The mixture was heated to 230° C. at which polycondensation reaction was allowed to proceed while distilling off condensed water. The polyester resin thus obtained had an acid value of 5 mgKOH/g (on a solids basis) and a number average molecular weight of 2,800.

Subsequently this resin was diluted with xylene to form 60 wt. % solution. Then 142 g (0.1 mole) of methyl iodide was added thereto and a reaction was allowed to proceed at 40° C. for 1 hour, thus giving quaternary ammonium base-containing polyester resin solution (A). The resin (A) contains about 0.42 mole of quaternary ammonium base per kg of the resin solids. The amount of quaternary ammonium base was determined according to the organic sulfuric acid salt method (J. Am., Pharm. Assoc., 43, 240, 1954), which comprises adding sodium lauryl sulfate solution dropwise to chloroform solution of the resin in the presence of Methyl Yellow as an indicator in an acidic atmosphere and calculating the amount of quaternary ammonium base from the titre.

EXAMPLES 2 and 3
Production of Polyester Resin Solutions

Polyester resin solutions were prepared in the same manner as in Example 1, except that the formulation was changed as shown in Table 1. Quaternary ammonium base-containing polyester resin solutions (B) and (C) were thus obtained.

EXAMPLE 4
Production of Polyester Resin Solution

A 5-liter 4-necked flask equipped with a stirrer, partial condenser, total condenser and torque meter was charged with 266 g (0.18 mole) of phthalic anhydride, 708 g (0.46 mole) of hexahydrophthalic anhydride, 438 g (0.3 mole) of adipic acid, 389 g (0.29 mole) of trimethylolpropane, 634 g (0.61 mole) of neopentyl glycol and 118 g (0.1 mole) of 1,6-hexanediol. The mixture was heated to 230° C. at which polycondensation reaction was allowed to proceed while distilling off condensed water. The polyester resin thus obtained had an acid value of 4 mgKOH/g (on a solids basis) and a number average molecular weight of 3,000.

Subsequently, 77 g (0.05 mole) of hexahydrophthalic anhydride was added thereto, and addition reaction between acid anhydride and hydroxyl groups in resin terminals was allowed to proceed at 140° C. for 2 hours to introduce carboxyl groups to the resin terminals. The resulting polyester resin was diluted with xylene to form 60 wt. % solution. Then 76 g (0.05 mole) of glycidyltrimethylammoniumchloride was added thereto and a reaction was allowed to proceed at 80° C. for 1 hour, thus giving quaternary ammonium base-containing polyester resin solution (D).

EXAMPLE 5
Production of Polyester Resin Solution

A polyester resin solution was prepared in the same manner as in Example 4, except that the formulation was changed as shown in Table 1. Quaternary ammonium base-containing polyester resin solution (E) was thus obtained.

EXAMPLE 6
Production of Polyester Resin Solution

A 5-liter 4-necked flask equipped with a stirrer, partial condenser, total condenser and torque meter was charged with 289 g (0.20 mole) of phthalic anhydride, 723 g (0.48 mole) of hexahydrophthalic anhydride, 438 g (0.3 mole) of adipic acid, 389 g (0.29 mole) of trimethylolpropane, 634 g (0.61 mole) of neopentyl glycol and 118 g (0.1 mole) of 1,6-hexanediol. The mixture was heated to 230° C. at which polycondensation reaction was allowed to proceed while distilling off condensed water. The reaction was terminated at the point when the polyester resin had an acid value of 15 mgKOH/g (on a solids basis). The resulting polyester resin had a number average molecular weight of 2,900.

Subsequently this resin was diluted with xylene to form 60 wt. % solution. Then 76 g (0.05 mole) of glycidyltrimethylammoniumchloride was added thereto and a reaction was allowed to proceed at 80° C. for 1 hour, thus giving quaternary ammonium base-containing polyester resin solution (F).

EXAMPLE 7
Production of Polyester Resin Solution

A polyester resin solution was prepared in the same manner as in Example 6, except that the formulation was changed as shown in Table 1. Quaternary ammonium base-containing polyester resin solution (G) was thus obtained.

COMPARATIVE EXAMPLE 1
Production of Polyester Resin Solution for Comparison

A 5-liter 4-necked flask equipped with a stirrer, partial condenser, total condenser and torque meter was charged with 266 g (0.18 mole) of phthalic anhydride, 708 g (0.46 mole) of hexahydrophthalic anhydride, 438 9 (0.3 mole) of adipic acid, 389 g (0.29 mole) of trimethylolpropane, 634 g (0.61 mole) of neopentyl glycol and 119 g (0.1 mole) of methyl diethanolamine. The mixture was heated to 230° C. at which polycondensation reaction was allowed to proceed while distilling off condensed water. The polyester resin thus obtained had an acid value of 5 mgKOH/g (on a solids basis) and a number average molecular weight of 3,000. Subsequently this resin was diluted with xylene to form 60 wt. % polyester resin solution (H).

COMPARATIVE EXAMPLE 2
Production of Polyester Resin Solution for Comparison

A 5-liter 4-necked flask equipped with a stirrer, partial condenser, total condenser and torque meter was charged with 266 g (0.18 mole) of phthalic anhydride, 708 g (0.46 mole) of hexahydrophthalic anhydride, 438 g (0.3 mole) of adipic acid, 389 g (0.29 mole) of trimethylolpropane, 634 g (0.61 mole) of neopentyl glycol and 118 g (0.1 mole) of 1,6-hexanediol. The mixture was heated to 230° C. at which polycondensation reaction was allowed to proceed while distilling off condensed water. The polyester resin thus obtained had an acid value of 4 mgKOH/g (on a solids basis) and a number average molecular weight of 5,300.

Subsequently, 77 g (0.05 mole) of hexahydrophthalic anhydride was added thereto, and addition reaction was allowed to proceed between acid anhydride and hydroxyl groups in resin terminals at 140° C. for 2 hours to introduce carboxyl groups to the resin terminals. The resulting resin was diluted with xylene to form 60 wt. % polyester resin solution (I).

COMPARATIVE EXAMPLE 3
Production of Polyester Resin Solution for Comparison

A 5-liter 4-necked flask equipped with a stirrer, partial condenser, total condenser and torque meter was charged with 289 g (0.20 mole) of phthalic anhydride, 723 g (0.48 mole) of hexahydrophthalic anhydride, 438 g (0.3 mole) of adipic acid, 389 g (0.29 mole) of trimethylolpropane, 634 g (0.61 mole) of neopentyl glycol and 118 g (0.1 mole) of 1,6-hexanediol. The mixture was heated to 230° C. at which polycondensation reaction was allowed to proceed while distilling off condensed water. The reaction was terminated at the point when the solution had an acid value of 15 mgKOH/g (on a solids basis). The resulting carboxyl-containing polyester resin had a number average molecular weight of 2,900.

This resin was diluted with xylene to form 60 wt. % solution and then 40 g (0.04 mole) of triethylamine was added to neutralize carboxyl groups, thus giving neutralized polyester resin solution (J).

Table 1 shows starting ingredients for polycondensation reaction to form polyester resins of Examples 1 to 7 and Comparative Examples 1 to 3; starting ingredients for introduction of quaternary ammonium base; acid value and number average molecular weight of each polyester resin obtained by polycondensation reaction; and amount of quaternary ammonium base as introduced to the resin. In Table 1, the amounts of ingredients are expressed by mole.

TABLE 1

| | Example | | | | |
|---|---|---|---|---|---|
| | 1 | 2 | 3 | 4 | 5 |
| Starting ingredients for polycondensation reaction | | | | | |
| Phthalic anhydride | 0.18 | 0.18 | 0.18 | 0.18 | 0.18 |
| Hexahydrophthalic anhydride | 0.46 | 0.46 | 0.46 | 0.46 | 0.46 |
| Adipic acid | 0.3 | 0.3 | 0.3 | 0.3 | 0.3 |
| Trimethylolpropane | 0.29 | 0.29 | 0.29 | 0.29 | 0.29 |
| Neopentyl glycol | 0.61 | 0.61 | 0.61 | 0.61 | 0.61 |
| 1,6-hexanediol | | | | 0.1 | 0.1 |
| Methyldiethanolamine | 0.1 | | | | 0.1 |
| Diethylethanolamine | | 0.1 | | | |
| Dimethylaminobenzoic acid | | | 0.1 | | |
| Acid value (mgKOH/g) | 5 | 5 | 5 | 4 | 4 |
| Number average molecular weight | 2,800 | 2,500 | 3,000 | 3,000 | 3,000 |
| Starting ingredients for introduction of quaternary ammonium base | | | | | |
| Methyl iodide | 0.1 | 0.1 | 0.1 | | |
| Hexahydrophthalic anhydride | | | | 0.05 | 0.05 |
| Glycidyltrimethyl-ammoniumchloride | | | | 0.05 | 0.05 |
| Triethylamine | | | | | |
| Amount of quaternary ammonium base (mole/kg) | 0.42 | 0.43 | 0.40 | 0.18 | 0.19 |
| Resin solution name | A | B | C | D | E |

| | Example | | Comparative Example | | |
|---|---|---|---|---|---|
| | 6 | 7 | 1 | 2 | 3 |
| Starting ingredients for polycondensation reaction | | | | | |
| Phthalic anhydride | 0.20 | 0.18 | 0.18 | 0.18 | 0.20 |
| Hexahydrophthalic anhydride | 0.48 | 0.46 | 0.46 | 0.46 | 0.48 |
| Adipic acid | 0.3 | 0.3 | 0.3 | 0.3 | 0.3 |
| Trimethylolpropane | 0.29 | 0.29 | 0.29 | 0.29 | 0.29 |
| Neopentyl glycol | 0.61 | 0.61 | 0.61 | 0.61 | 0.61 |
| 1,6-hexanediol | | 0.1 | | 0.1 | 0.1 |

TABLE 1-continued

| | | | | | |
|---|---|---|---|---|---|
| Methyldiethanolamine | | 0.1 | 0.1 | | |
| Diethylethanolamine | | | | | |
| Dimethylaminobenzoic acid | | | | | |
| Acid value (mgKOH/g) | 15 | 15 | 5 | 4 | 15 |
| Number average molecular weight | 2,900 | 2,900 | 2,900 | 3,000 | 2,900 |
| Starting ingredients for introduction of quaternary ammonium base | | | | | |
| Methyl iodide | | | | | |
| Hexahydrophthalic anhydride | | | | 0.05 | |
| Glycidyltrimethyl-ammoniumchloride | 0.05 | 0.05 | | | |
| Triethylamine | | | | | 0.01 |
| Amount of quaternary ammonium base (mole/kg) | 0.19 | 0.19 | — | — | — |
| Resin solution name | F | G | H | I | J |

EXAMPLES 8–21 and COMPARATIVE EXAMPLES 4–9

Production of Pigment Dispersions and Coating Compositions

The polyester resin solutions obtained in Examples 1–7 and Comparative Examples 1–3 were diluted with a mixed solvent of toluene and butanol (1:1 by weight) to form 50 wt. % resin solutions (on a solids basis). The resulting resin solutions were mixed with a pigment (titanium white or Phthalocyanine Blue) in the amounts shown in Table 2 and dispersed with a paint shaker (using glass beads 1 mm φ in diameter) for 4 hours, thus producing pigment dispersions.

The pigment dispersions obtained in Examples 8–21 had titanium white or hardly dispersible Phthalocyanine Blue as fully dispersed therein, and had satisfactory viscous flow and no problem in stability.

On the other hand, of the dispersions obtained in Comparative Examples 4–9, those containing Phthalocyanine Blue had increased viscosity because this pigment was not fully dispersed therein.

Then added to these pigment dispersions were basal resin "polyester polyol" (product of Kansai Paint Co., Ltd., a nonvolatile content of 60 wt. %, a hydroxyl value of 105 mgKOH/g, an acid value of 5 mgKOH/g, a number average molecular weight of 6,000), melamine resin as crosslinking agent (trade name "U-VAN 20SE-60", product of Mitsui Toatsu Chemicals Inc., a nonvolatile content of 60 wt. %), and a curing catalyst (trade name "Catalyst 6000", product of Mitsui Toatsu Chemicals Inc., sulfonic acid catalyst) in the amounts shown in Table 2, followed by stirring to form coating compositions.

Table 2 shows formulations of pigment dispersions and those of coating compositions containing the pigment dispersions. The amounts of ingredients are expressed by parts by weight on a solids basis.

TABLE 2

| | Example | | | | | | | | | |
|---|---|---|---|---|---|---|---|---|---|---|
| | 8 | 9 | 10 | 11 | 12 | 13 | 14 | 15 | 16 | 17 |
| Pigment dispersion | | | | | | | | | | |
| Resin solution name | A | B | C | D | E | F | G | A | B | C |
| Amount | 24 | 24 | 24 | 24 | 24 | 24 | 24 | 24 | 24 | 24 |
| Titanium white | 60 | 60 | 60 | 60 | 60 | 60 | 60 | | | |
| Phthalocyanine Blue | | | | | | | | 30 | 30 | 30 |
| Mixed solvent | 60 | 60 | 60 | 60 | 60 | 60 | 60 | 82 | 82 | 82 |
| Basal resin | | | | | | | | | | |
| Polyester polyol Crosslinking agent | 50 | 50 | 50 | 50 | 50 | 50 | 50 | 50 | 50 | 50 |
| Melamine resin | 30 | 30 | 30 | 30 | 30 | 30 | 30 | 30 | 30 | 30 |
| Curing catalyst | 1 | 1 | 1 | 1 | 1 | 1 | 1 | 1 | 1 | 1 |

| | Example | | | | Comparative Example | | | | | |
|---|---|---|---|---|---|---|---|---|---|---|
| | 18 | 19 | 20 | 21 | 4 | 5 | 6 | 7 | 8 | 9 |
| Pigment dispersion | | | | | | | | | | |
| Resin solution name | D | E | F | G | H | I | J | H | I | J |
| Amount | 24 | 24 | 24 | 24 | 24 | 24 | 24 | 24 | 24 | 24 |
| Titanium white | | | | | 60 | 60 | 60 | | | |
| Phthalocyanine Blue | 30 | 30 | 30 | 30 | | | | 30 | 30 | 30 |
| Mixed solvent | 82 | 82 | 82 | 82 | 60 | 60 | 60 | 82 | 82 | 82 |
| Basal resin | | | | | | | | | | |
| Polyester polyol Crosslinking agent | 50 | 50 | 50 | 50 | 50 | 50 | 50 | 50 | 50 | 50 |
| Melamine resin | 30 | 30 | 30 | 30 | 30 | 30 | 30 | 30 | 30 | 30 |
| Curing catalyst | 1 | 1 | 1 | 1 | 1 | 1 | 1 | 1 | 1 | 1 |

The coating compositions obtained above were subjected to the following performance tests.

Transparency: The coating compositions obtained in Examples 15–21 and Comparative Example 7–9 were used. Each coating composition was applied to a transparent PET film (100×200 mm) with a bar coater to form a coating film 15 pm thick (when dried), followed by baking at 140° C. for 30 minutes. The coating on the PET film was visually checked to evaluate its transparency on the following criteria.
A: the coating is not turbid at all and has high transparency;
B: the coating is somewhat turbid and has slightly low transparency;
C: the coating is very turbid and has low transparency.

Gloss: Zinc phosphating dull steel plates 0.8 mm thick were subjected to electrodeposition, followed by intermediate coating to form test plates. Each coating composition was sprayed on a test plate to form a coating film 30 pm thick (when dried), followed by baking at 140° C. for 30 minutes. With respect to the coated test plates thus formed, gloss (%) was measured at a 60 degree angle according to JIS K-5400.

Water resistance: Coated test plates were prepared in the same manner as in the gloss test and then immersed in 40° C. water for 10 days. The coating was visually checked to evaluate its appearance on the following criteria.

A: no abnormalities on the surface and excellent water resistance;

B: a slight degree of fog on the surface and slightly poor water resistance;

C: fog and blistering on the surface and poor water resistance.

Table 3 shows results of the performance tests of the coating compositions.

TABLE 3

|  | Example | | | | | | | | | |
| --- | --- | --- | --- | --- | --- | --- | --- | --- | --- | --- |
|  | 8 | 9 | 10 | 11 | 12 | 13 | 14 | 15 | 16 | 17 |
| Transparency |  |  |  |  |  |  |  | A | A | A |
| Gloss | 92 | 95 | 94 | 96 | 98 | 94 | 94 | 94 | 95 | 94 |
| Water resistance | A | A | A | A | A | A | A | A | A | A |

|  | Example | | | | Comparative Example | | | | | |
| --- | --- | --- | --- | --- | --- | --- | --- | --- | --- | --- |
|  | 18 | 19 | 20 | 21 | 4 | 5 | 6 | 7 | 8 | 9 |
| Transparency | A | A | A | A |  |  |  | A | B | C |
| Gloss | 96 | 98 | 92 | 92 | 80 | 62 | 85 | 62 | 40 | 48 |
| Water resistance | A | A | A | A | A | B | C | A | C | C |

The polyester resin of the invention, which contains a specific quaternary ammonium base as polar group, has excellent pigment dispersibility and is capable of fully dispersing a wide variety of pigments and inorganic powders in a short time so as to form stable dispersion. Therefore, pigment dispersions and coating compositions, each containing this polyester resin as resin for pigment dispersion are excellent in storage properties and stability, free of coagulation of pigment and increased viscosity, and capable of forming coating film with excellent water resistance, high gloss and good coloring property. The polyester resin of the invention produces particularly remarkable effects on phthalocyanine pigments. Therefore, the polyester resin of the invention is highly suitable for coating materials, inks, adhesives, and the like.

What is claimed is:

1. A process for producing a polyester resin with the use of at least one polybasic acid and at least one polyhydric alcohol as starting ingredients, which comprises the steps of polycondensating, together with the polybasic acid and the polyhydric alcohol, a nitrogen-containing compound represented by the formula

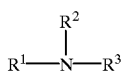

(II)

(wherein $R^1$, $R^2$ and $R^3$ are the same or different and independently represent hydroxyalkyl, carboxyaryl, carboxyalkyl, carboxycycloalkyl, hydrogen, alkyl, cycloalkyl or aryl, provided that at least one of $R^1$, $R^2$ and $R^3$ represents hydroxyalkyl, carboxyaryl, carboxyalkyl or carboxycycloalkyl) to introduce amino groups to the resin, and reacting the amino groups with alkyl halide to convert some or all of the amino groups to quaternary ammonium base represented by the formula

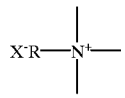

(I)

(wherein X is halogen and R is alkyl).

2. The process for production according to claim 1 wherein the nitrogen-containing compound is alkanolamine, which is used in an amount of 0.3 mole % or more, based on the total molar amount of the polyhydric alcohol component.

3. The process for production according to claim 1 wherein the nitrogen-containing compound is aromatic aminocarboxylic acid, which is used in an amount of 0.3 mole % or more, based on the total molar amount of the polybasic acid component.

4. The polyester resin produced by the process according to claim 1.

5. A pigment dispersion containing the polyester resin according to claim 4 and a pigment.

6. A coating composition containing the pigment dispersion according to claim 5.

7. A process for producing a polyester resin, which comprises the steps of preparing a polyester resin with the use of at least one polybasic acid and at least one polyhydric alcohol as starting ingredients and subjecting the remaining carboxyl groups in the polyester resin to addition reaction with a quaternary ammonium base-containing epoxy compound represented by the formula

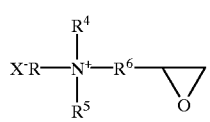

(III)

(wherein X is halogen, R is alkyl, $R^4$ and $R^5$ are the same or different and independently represent alkyl, cycloalkyl or aryl and $R^6$ represents alkylene) to introduce a quaternary ammonium base to the resin.

8. The polyester resin produced by the process according to claim 7.

9. A pigment dispersion containing the polyester resin according to claim 8 and a pigment.

10. A coating composition containing the pigment dispersion according to claim 9.

11. A process for producing a polyester resin, which comprises the steps of preparing a polyester resin with the use of at least one polybasic acid and at least one polyhydric alcohol as starting ingredients, subjecting the remaining hydroxyl groups in the polyester resin to addition reaction with acid anhydride to introduce carboxyl groups to the resin, and subjecting the carboxyl groups in the resin to addition reaction with a quaternary ammonium base-containing epoxy compound represented by the formula

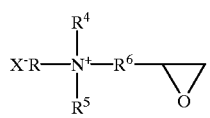

(III)

(wherein X is halogen, R is alkyl, $R^4$ and $R^5$ are the same or different and independently represent alkyl, cycloalkyl or aryl and $R^6$ represents alkylene) to introduce a quaternary ammonium base to the resin.

12. The polyester resin produced by the process according to claim 11.

13. A pigment dispersion containing the polyester resin according to claim 12 and a pigment.

14. A coating composition containing the pigment dispersion according to claim 13.

* * * * *

UNITED STATES PATENT AND TRADEMARK OFFICE
CERTIFICATE OF CORRECTION

PATENT NO. : 6,174,965 B1
DATED : January 16, 2001
INVENTOR(S) : Fumio Yamashita et al.

It is certified that error appears in the above-identified patent and that said Letters Patent is hereby corrected as shown below:

Title page,
Item [73], change the Assignee "Kansai Paint Company, Limited," to -- Kansai Paint Co., Ltd. --.

Signed and Sealed this

Eighteenth Day of September, 2001

Attest:

Nicholas P. Godici

NICHOLAS P. GODICI
*Acting Director of the United States Patent and Trademark Office*

*Attesting Officer*